United States Patent
Murakawa (10) Patent No.: US 10,061,295 B2
(45) Date of Patent: Aug. 28, 2018

(54) NUMERICAL CONTROLLER EQUIPPED WITH DRAWING PATH CORRECTION FUNCTION

(71) Applicant: FANUC Corporation, Minamitsuru-gun, Yamanashi (JP)

(72) Inventor: Kazuhiko Murakawa, Yamanashi (JP)

(73) Assignee: FANUC Corporation, Minamitsuru-gun, Yamanashi (JP)

(*) Notice: Subject to any disclaimer, the term of this patent is extended or adjusted under 35 U.S.C. 154(b) by 273 days.

(21) Appl. No.: 14/993,158

(22) Filed: Jan. 12, 2016

(65) Prior Publication Data
US 2016/0209825 A1    Jul. 21, 2016

(30) Foreign Application Priority Data

Jan. 20, 2015 (JP) .................................. 2015-008930

(51) Int. Cl.
*G06F 19/00* (2018.01)
*G05B 19/4068* (2006.01)
(Continued)

(52) U.S. Cl.
CPC ........ *G05B 19/4068* (2013.01); *G05B 19/402* (2013.01); *G05B 19/4086* (2013.01);
(Continued)

(58) Field of Classification Search
CPC ...... G05B 19/4068; G05B 2219/35353; G05B 19/402; G05B 19/4086; G05B 2219/35289
See application file for complete search history.

(56) References Cited

U.S. PATENT DOCUMENTS 5,126,646 A * 6/1992 Fujita ................. G05B 19/4069
318/569
5,563,484 A 10/1996 Otsuki et al.
(Continued)

FOREIGN PATENT DOCUMENTS

CN    102402199 A    4/2012
CN    102621930 A    8/2012
(Continued)

OTHER PUBLICATIONS

Extended European Search Report dated Jun. 9, 2016 in European Patent Application No. 15203084.7.
(Continued)

*Primary Examiner* — Michael D Masinick
(74) *Attorney, Agent, or Firm* — Drinker Biddle & Reath LLP (57) ABSTRACT

A numerical controller is equipped with a check drawing function for drawing an unmachined path based on a machining program and a machining drawing function for drawing a machining trajectory during machining control based on the machining program. The numerical controller calculates a drawing trajectory correction vector which represents an amount of shift in an axial position at which machining is actually performed from an axial position commanded by the machining program, and creates a corrected machining trajectory by correcting a drawing position of the machining trajectory drawn by the machining drawing function, based on the calculated drawing trajectory correction vector. Then, the corrected machining trajectory and the unmachined path are displayed on a same screen.

6 Claims, 9 Drawing Sheets

(51) Int. Cl.
G05B 19/402 (2006.01)
G05B 19/408 (2006.01)

(52) U.S. Cl.
CPC ........... *G05B 2219/35289* (2013.01); *G05B 2219/35353* (2013.01)

(56) References Cited

U.S. PATENT DOCUMENTS

| | | | |
|---|---|---|---|
| 6,073,058 A | | 6/2000 | Cossen et al. |
| 9,715,228 B2 * | | 7/2017 | Kurohara ........... G05B 19/4067 |
| 2005/0209712 A1 | | 9/2005 | Sagasaki et al. |
| 2013/0291661 A1 * | | 11/2013 | Sato .................... G05B 19/408 73/865.9 |
| 2013/0325166 A1 | | 12/2013 | Tezuka et al. |
| 2015/0227133 A1 * | | 8/2015 | Kurohara ........... G05B 19/4067 700/186 |
| 2016/0031025 A1 * | | 2/2016 | Shirai .................... B23H 1/024 219/69.13 |

FOREIGN PATENT DOCUMENTS

| | | |
|---|---|---|
| CN | 102681483 A | 9/2012 |
| JP | H05-11830 A | 1/1993 |
| JP | H05-73126 A | 3/1993 |
| JP | H06-59717 A | 3/1994 |
| JP | H06-124112 A | 5/1994 |
| JP | H07-311612 A | 11/1995 |
| JP | H09-16238 A | 1/1997 |

OTHER PUBLICATIONS

Notification of Reasons for Refusal dated Sep. 6, 2016 in Japanese Patent Application No. 2015-008930 (4 pages) with an English Translation (2 pages).

Office Action dated May 12, 2017 in European Patent Application No. 15 203 084.7.

* cited by examiner

```
START HOLE SEARCH MACRO
O9100                (MACRO PROGRAM NO.)
M81                  (DISABLE CHECK DRAWING)
#100=0
WHILE(#100EQ0)DO20   (LOOP BETWEEN CURRENT LINE AND END20)
M60                  (CONNECT WIRE)
IF(#1000NE1)GOTO10   (JUMP TO N10 IF WIRE CONNECTION FAILS)
#100=1               (WIRE CONNECTION SUCCESSFUL)
GOTO20               (JUMP TO END20)
N10
G91G00X_Y_           (SEARCH FOR HOLE)
END20                (WHILE LOOP)
G72P0                (DETECT HOLE CENTER)
G74P0                (POSITIONING AT HOLE CENTER)
M82                  (ENABLE CHECK DRAWING)
M99                  (END OF MACRO)
```

```
O0100            (MACHINING PROGRAM NO.)
G90G54G00X_Y_    (POSITIONING AT FIRST MACHINING START HOLE)
M60              (CONNECT WIRE)
M98P0101         (FIRST MACHINING SUBPROGRAM)
M50              (CUT WIRE)
G90G55G00X_Y_    (POSITIONING AT SECOND MACHINING START HOLE)
M60              (CONNECT WIRE)
M98P0102         (SECOND MACHINING SUBPROGRAM)
M50              (CUT WIRE)
G90G56G00X_Y_    (POSITIONING AT THIRD MACHINING START HOLE)
M60              (CONNECT WIRE)
M98P0103         (THIRD MACHINING SUBPROGRAM)
M50              (CUT WIRE)
M30              (END OF MACHINING)
```

NUMERICAL CONTROLLER EQUIPPED WITH DRAWING PATH CORRECTION FUNCTION

RELATED APPLICATION DATA

This application claims priority under 35 U.S.C. § 119 and/or § 365 to Japanese Application No. 2015-008930 filed Jan. 20, 2015, the entire contents is incorporated herein by reference.

BACKGROUND OF THE INVENTION

1. Field of the Invention

The present invention relates to a numerical controller, and more particularly, to a numerical controller equipped with a drawing path correction function for drawing a machining path by correcting machining path deviations occurring during machining.

2. Description of the Related Art

Generally, a numerical controller is equipped with a check drawing function for checking an NC program before machining and a machining drawing function for displaying a machining trajectory by plotting locations during machining. Furthermore, a check drawing path produced before machining and a trajectory produced by machining drawing are displayed in superposed manner, thereby making it possible to check the progress of machining (see, for example, Japanese Patent Application Laid-Open No. 05-033126).

Figure 9:
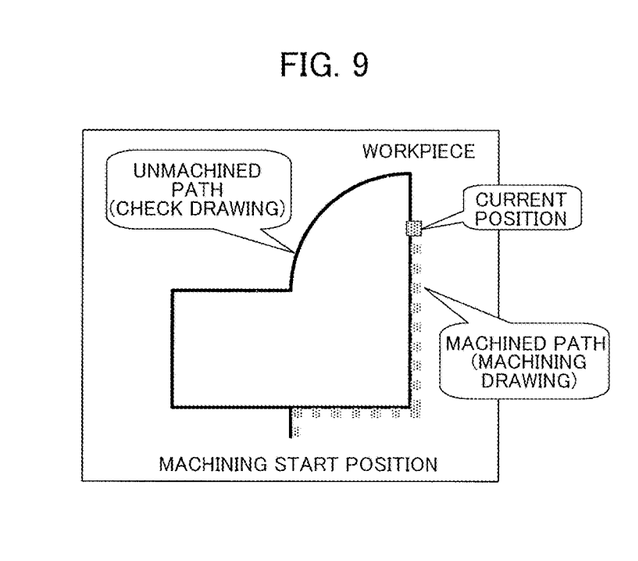
FIG. 9 is a display example of an unmachined path and machining trajectory in wire electrical discharge machining according to a conventional technique.

An example of a conventional technique is shown in FIG. 9, in which, for example, an unmachined path and machined path during wire electrical discharge machining are displayed in superposed manner, thereby making it possible to check the progress of machining. As shown in FIG. 9, the unmachined path is displayed before machining so that a machining program may be checked. Such a drawing display is referred to as check drawing. Regarding the machined path, a trajectory is drawn by displaying the current positions, moment by moment, as a point sequence during machining. Such a drawing display is referred to as machining drawing.

However, there is a problem in that if it becomes necessary to carry out machining at a position shifted from a position commanded by a machining program due to pre-machining treatment of a workpiece, a mounting error of a machine tool, or a programming error in a machining start position, the path of check drawing and trajectory of machining drawing do not overlap each other, making it impossible to judge the progress of machining accurately.

This problem will be described by taking as an example a multi-piece machining program for the wire electrical discharge machining of FIG. 10. FIG. 11 is a check drawing according to the machining program of FIG. 10.

Figure 10:
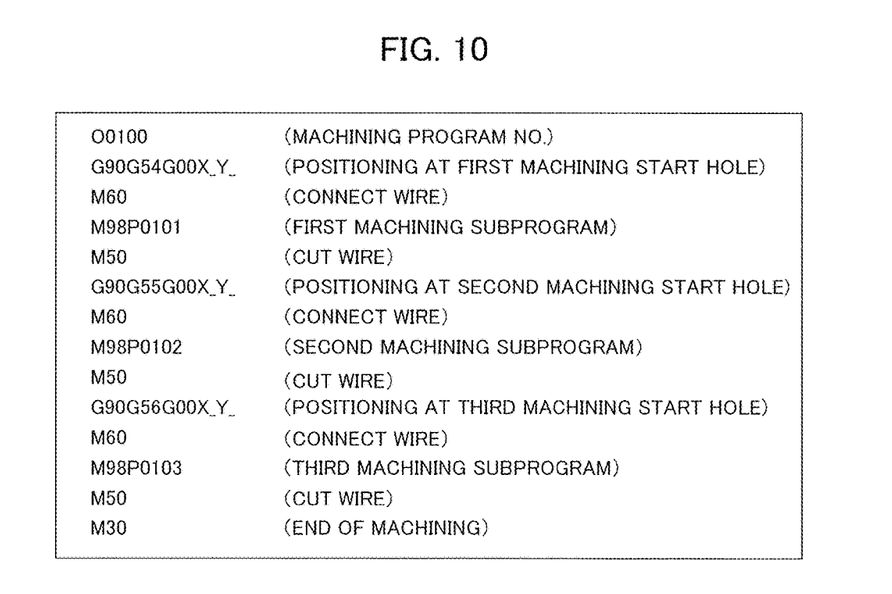
FIG. 10 is an example of a multi-piece machining program in wire electrical discharge machining.
Figure 11:
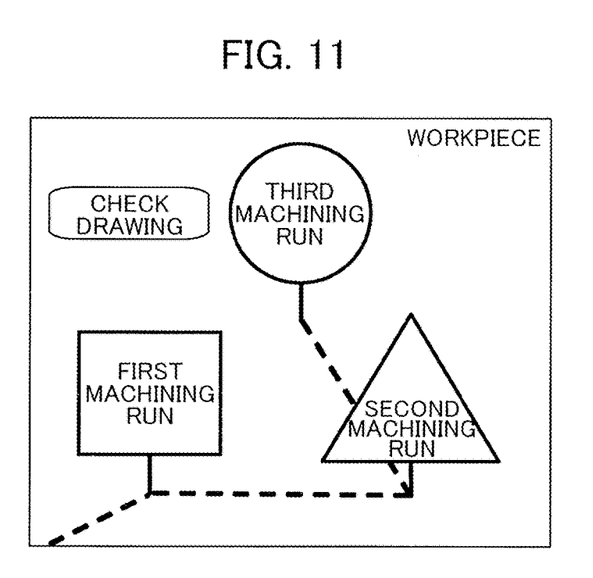
FIG. 11 is a display example of check drawing based on a multi-piece machining program.

For example, in the case of multi-piece machining shown in FIGS. 10 and 11, before a workpiece is mounted on a wire electrical discharge machine, start holes for wire connection are provided at start positions of respective machining runs in advance. However, due to workpiece displacement caused when a workpiece is mounted on the wire electrical discharge machine, errors in a machining program, or errors in the position or hole diameter of machining start holes provided in advance, start positions commanded by the program and start hole positions of respective machining runs may sometimes deviate from each other as shown in FIG. 12.

In such a case, it is necessary to measure the hole positions of the machining start holes and correct the machining program accordingly, but the correction operation takes a great deal of time and effort, and consequently it is often the case that machining is carried out directly without correcting the machining program.

Figure 12:
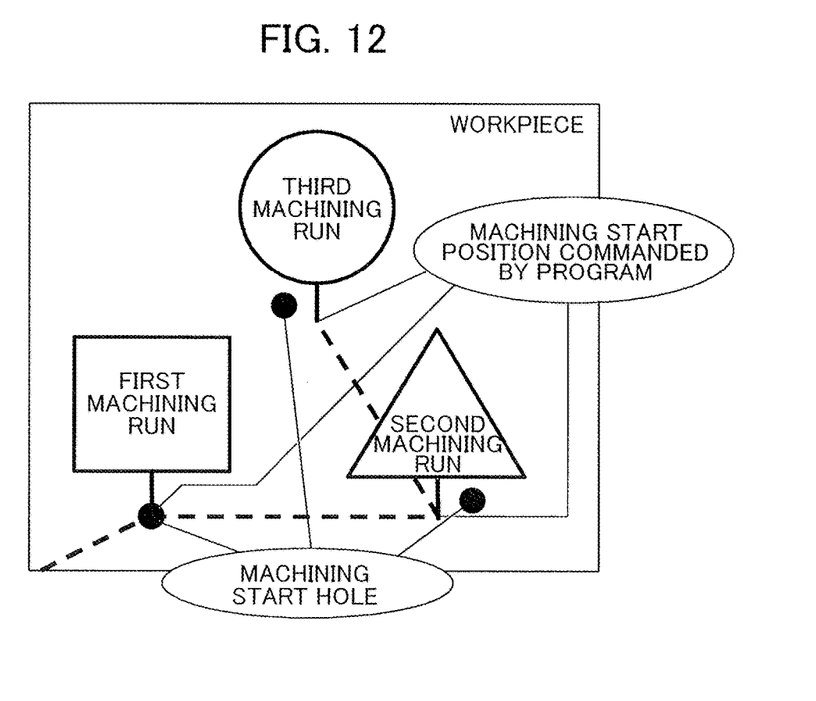
FIG. 12 is a diagram describing deviations between machining start positions commanded by a program and positions of machining start holes provided in a workpiece.

Referring to the example of FIG. 12, if machining is carried out in such a situation, since a second machining start hole does not match the start position when positioning at the second machining start hole is performed, connection of the wire fails, causing automatic operation to pause and output a warning indicating failure of connection. An operator manually moves an axis to near the center of the start hole and restarts the automatic operation with a wire connection command in an interrupted block. Then, the wire is connected and the second machining run is performed.

Figure 13:
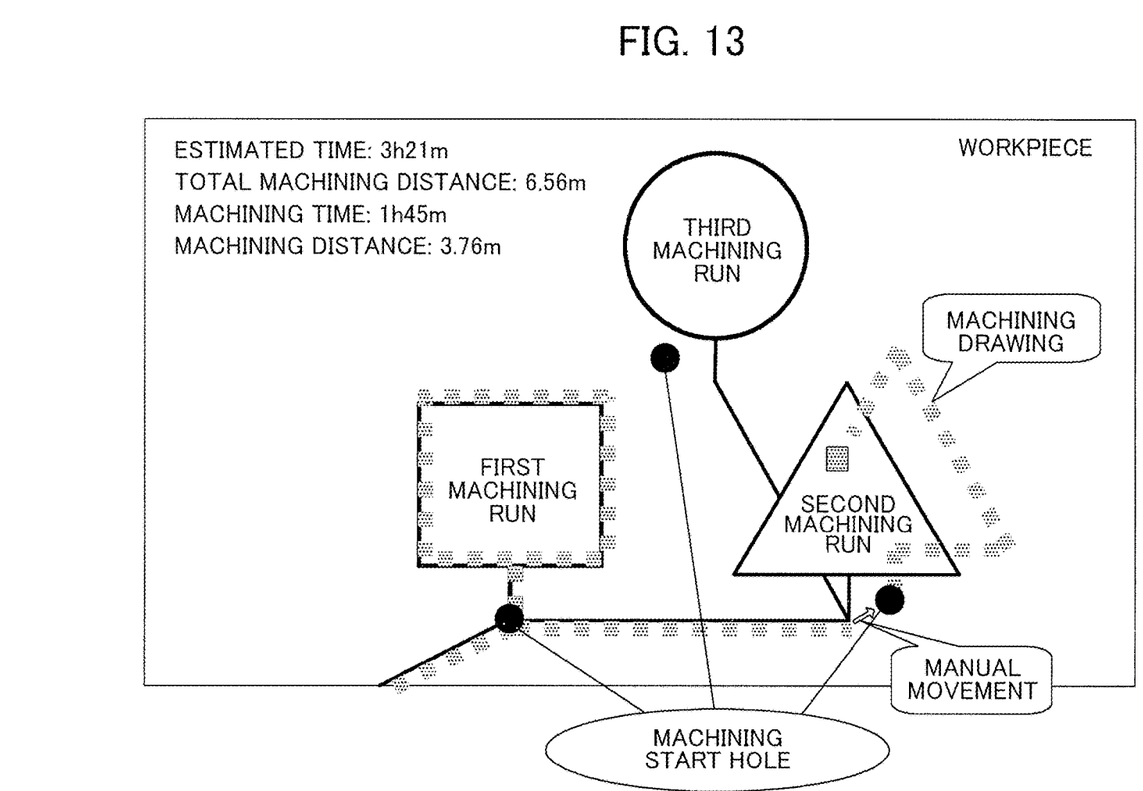
FIG. 13 is a diagram describing deviations in display between an unmachined path and machining trajectory.

However, as shown in FIG. 13, with this type of machining, the trajectory of machining drawing deviates from the path of check drawing by an amount corresponding to the amount moved by manual operation. When drawing is done with such a deviation, there is a problem in that a relationship between an unmachined path and machined path becomes difficult to see in the case of a complicated machining geometry, making it difficult to judge the progress of machining from the drawing alone and thereby making it necessary for an operator to judge approximate progress of machining based on a relationship between estimated machining time and actual machining time or between estimated machining distance and actual machining distance.

SUMMARY OF THE INVENTION

Thus, an object of the present invention is to provide a numerical controller equipped with a drawing path correction function for drawing a machining path by correcting machining path deviations occurring during machining.

A numerical controller according to the present invention is equipped with a check drawing function for drawing an unmachined path based on a machining program and a machining drawing function for drawing a machining trajectory during machining control based on the machining program.

A first form of the numerical controller according to the present invention includes a trajectory correction vector calculation unit adapted to calculate a drawing trajectory correction vector which represents an amount of shift in an axial position at which machining is actually performed from an axial position commanded by the machining program; a drawing trajectory creating unit adapted to create a corrected machining trajectory by correcting a drawing position of the machining trajectory drawn by the machining drawing function, based on the drawing trajectory correction vector; and a display unit adapted to display the corrected machining trajectory created by the drawing trajectory creating unit and the unmachined path on a same screen.

The numerical controller may further include a manual-intervention-amount creating unit adapted to command an axis to be moved based on a manual operation by an operator, wherein the trajectory correction vector calculation unit may determine the drawing trajectory correction vector based on axial positions before and after the axis is moved by the manual-intervention-amount creating unit.

The numerical controller may further include a drawing-disabled determination unit adapted to determine whether the check drawing function is enabled or disabled, based on a macro command contained in the machining program and configured to switch the check drawing function between enabled state and disabled state, wherein the trajectory correction vector calculation unit may determine the drawing trajectory correction vector based on axial positions before and after a period when the check drawing function is determined to be disabled.

A second form of the numerical controller according to the present invention includes a trajectory correction vector calculation unit adapted to calculate a drawing trajectory correction vector which represents an amount of shift in an axial position at which machining is actually performed from an axial position commanded by the machining program; a drawing trajectory creating unit adapted to create a corrected unmachined path by correcting a drawing position of the unmachined path drawn by the check drawing function, based on the drawing trajectory correction vector; and a display unit adapted to display the corrected unmachined path and the machining trajectory on a same screen.

The numerical controller may further include a manual-intervention-amount creating unit adapted to command an axis to be moved based on a manual operation by an operator, wherein the trajectory correction vector calculation unit may determine the drawing trajectory correction vector based on axial positions before and after the axis is moved by the manual-intervention-amount creating unit.

The numerical controller may further include a drawing-disabled determination unit adapted to determine whether the check drawing function is enabled or disabled, based on a macro command contained in the machining program and configured to switch the check drawing function between enabled state and disabled state, wherein the trajectory correction vector calculation unit may determine the drawing trajectory correction vector based on axial positions before and after a period when the check drawing function is determined to be disabled.

With the present invention, the trajectory of machining drawing and the check drawing path produced before machining are superposed exactly on each other, making it possible to check the progress of machining accurately.

BRIEF DESCRIPTION OF THE DRAWINGS

The above and other objects and features of the present invention will become more apparent from the following description of the embodiments taken in conjunction with the accompanying drawings, wherein.

DETAILED DESCRIPTION OF THE PREFERRED EMBODIMENTS

An embodiment of the present invention will be described below with reference to the drawings. First, a technical overview of the present invention will be described.

The present invention finds an amount of shift (drawing trajectory correction vector) which occurs during machining with respect to a machining program and displays a trajectory of machining drawing by making a correction by an amount corresponding to the drawing trajectory correction vector. Alternatively, a check drawing trajectory produced before machining is displayed after correction.

The amount of shift (drawing trajectory correction vector) during machining is found as follows.

Method 1: If automatic operation is stopped at a start position of each machining part and an axis is moved by manual operation, the amount of shift is obtained from the difference between the position at which the automatic operation is halted and the position at which the automatic operation is restarted.

Method 2: When machining position is adjusted during automatic operation using a start position search function (macro program configured to automatically adjust a start position), the amount of shift is obtained from the difference between the positions at the start and end of the macro program.

Also, according to the present invention, in order to enable corrections to each type of drawing not only for entire machining, but also for each part to be machined, if a command (presetting of a work coordinate system or positioning in a machine coordinate system) which disables the amount of shift is issued during machining, the amount of shift is cleared and any correction to the trajectory of machining drawing is cancelled.

Figure 1:
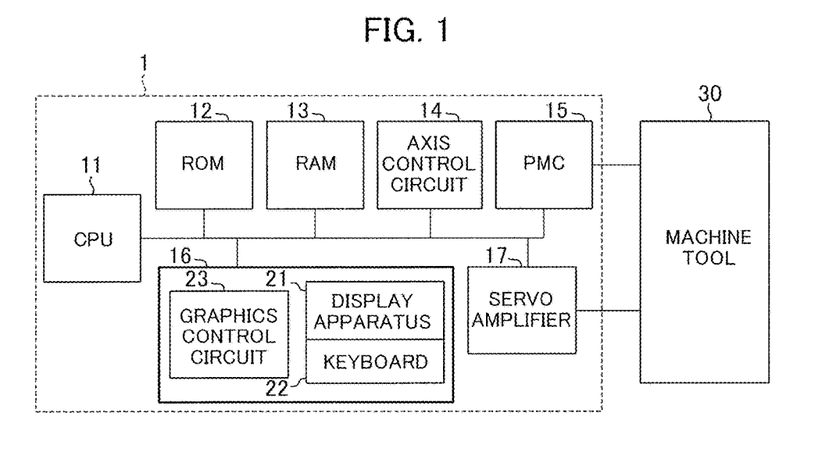
FIG. 1 is a block diagram showing principal part of a numerical controller according to the present invention.

FIG. 1 is a schematic block diagram of a numerical controller according to the present invention.

The numerical controller 1 includes a CPU 11 adapted to control the entire numerical controller 1 and connected with a ROM 12, a RAM 13, an axis control circuit 14, a PMC 15, an indicator/MDI unit 16, and a servo amplifier 17 via a bus.

The ROM 12 stores a system program used to control the entire numerical controller 1. The RAM 13 stores a machining program and the like used by the numerical controller 1 in controlling a machine tool 30. The machining program is usually stored in a non-volatile memory (not shown), and read out of the non-volatile memory and stored in the RAM 13 at the time of execution. The CPU 11 executes the machining program sequentially while reading the machining program out of the RAM 13, and thereby controls the axis control circuit 14 and controls the machine tool 30 via the servo amplifier 17.

Also, the PMC (programmable machine controller) 15 controls auxiliary equipment and the like on the side of the machine tool using a sequence program built into the numerical controller 1.

The indicator/MDI unit 16 includes a display apparatus 21, a keyboard 22, and a graphics control circuit 23, where the display apparatus 21 displays status information about the numerical controller 1 and information about machining status, an unmachined path drawn by a check drawing function, and a machining trajectory drawn by a machining drawing function; the keyboard 22 accepts operator's operations; and the graphics control circuit 23 generates screen information for use to display the above-mentioned various information based on commands from the CPU 11 and performs control in displaying the screen information on the display apparatus 21.

Forms of a drawing path correction function implemented on the numerical controller 1 configured as illustrated in FIG. 1 will be described in detail below.

First, a first form of the drawing path correction function implemented on the numerical controller 1 shown in FIG. 1 will be described with reference to FIGS. 2 to 5.

Figure 2:
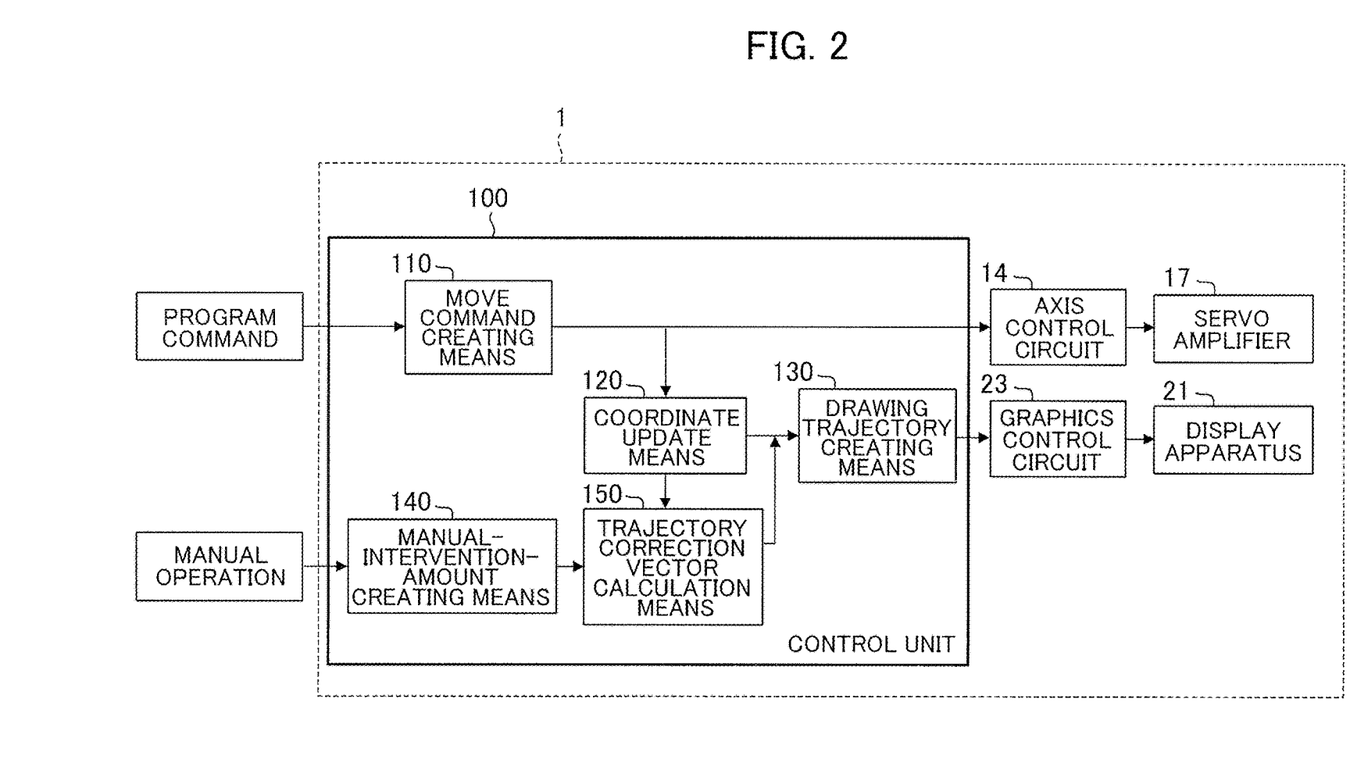
FIG. 2 is functional block diagram of the numerical controller of FIG. 1 equipped with a first form of a drawing path correction function.

The first form of the drawing path correction function relates to drawing path correction of a machining trajectory performed when an axis is moved manually by an operator. FIG. 2 is a functional block diagram of the numerical controller 1 equipped with the drawing path correction function of this form.

As shown in FIG. 2, the numerical controller 1 includes a control unit 100. The control unit 100, which is functional means implemented on the numerical controller 1 when the CPU 11 executes the system program, includes move command creating means 110, coordinate update means 120, drawing trajectory creating means 130, manual-intervention-amount creating means 140, and trajectory correction vector calculation means 150 as subfunctional means.

The move command creating means 110 creates a move command based on a program command read out of a machining program and outputs the move command to the axis control circuit 14 and coordinate update means 120.

The coordinate update means 120, which is functional means for managing axial coordinates displayed on the display apparatus 21, updates current axial coordinate values based on the move command outputted from the move command creating means 110, and outputs the updated axial coordinate values to the drawing trajectory creating means 130 and trajectory correction vector calculation means 150.

The drawing trajectory creating means 130 creates data on an axial drawing trajectory (machining trajectory) based on the axial coordinate values accepted as input and outputs the created data to the graphics control circuit 23.

The manual-intervention-amount creating means 140 creates a command regarding an amount of manual axial movement by receiving an input signal produced when the operator manually operates a control panel or the like, and outputs the created amount of movement to the axis control circuit 14 and trajectory correction vector calculation means 150.

The trajectory correction vector calculation means 150 stores an axial position at which automatic operation is halted due to a failure in wire connection and an axial position at which the automatic operation is restarted by manually moving the axis to near the center of a start hole, calculates a drawing trajectory correction vector (described later) based on the stored axial positions, and makes corrections to the axial coordinate values to be outputted from the coordinate update means 120 to the drawing trajectory creating means 130, based on the calculated drawing trajectory correction vector.

Now, the drawing trajectory correction vector will be described below with reference to FIG. 3.

Figure 3:
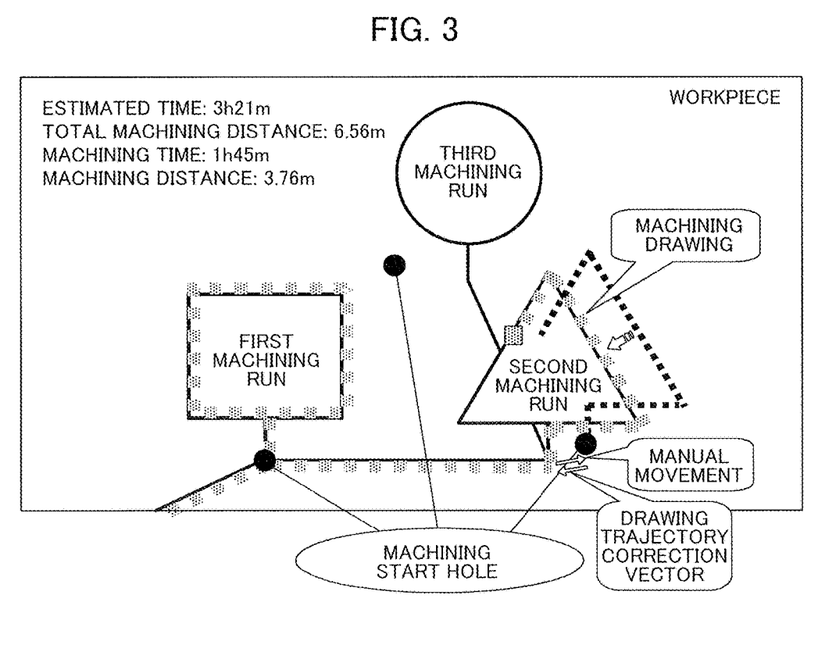
FIG. 3 is a diagram showing a display example of an unmachined path and machining trajectory displayed on a display apparatus of the numerical controller shown in FIG. 2.

FIG. 3 shows a display example of an unmachined path and machining trajectory displayed on the display apparatus 21 of the numerical controller 1 in a case where second and third machining start holes provided in a workpiece deviate from machining start positions commanded by a machining program in performing multi-piece machining to acquire three machined members from one workpiece.

In a case where a workpiece is machined through automatic operation performed by the numerical controller 1 based on a machining program, when positioning to a second machining start hole is performed based on machining program commands, the position by the positioning does not match the start hole which has been provided in advance. In this case, the automatic operation pauses due to failure of wire connection and warning indicating the failure of wire connection is output. Subsequently, the operator moves the axis to near the center of the start hole by manually operating a control panel or the like and restarts the automatic operation with a wire connection command in an interrupted block.

In so doing, the trajectory correction vector calculation means 150 determines the amount and direction (drawing trajectory correction vector) of the deviation of the start hole, based on the difference between the axial position at which automatic operation is halted due to a failure in wire connection (i.e., the axial position before manual operation is started) and the axial position at which the automatic operation is restarted by manually moving the axis to near the center of the start hole (i.e., the axial position after manual operation is finished). Then, when a trajectory of machining drawing is drawn, the coordinate values outputted by the coordinate update means 120 is corrected by adding the determined drawing trajectory correction vector thereto, and the drawing trajectory creating means 130 creates data on the drawing trajectory (machining trajectory) based on the coordinate values thus corrected. This makes it possible to bring the path of check drawing and trajectory of machining drawing into coincidence.

Also, when the second machining run is finished and positioning at the third machining start position is performed, since the deviations between the program command and actual machining path are eliminated once, if a command to solve the deviations between the program command and actual machining path is executed, the trajectory correction vector calculation means 150 clears the drawing trajectory correction vector. Consequently, the machining trajectory is corrected to the position of the unmachined path with the amounts of correction not accumulated in each machining stage of multi-piece machining, and is displayed. Note that commands used to eliminate deviations include those related to workpiece coordinate system setting, machine coordinate system positioning, and relative coordinate system positioning.

Figure 4:
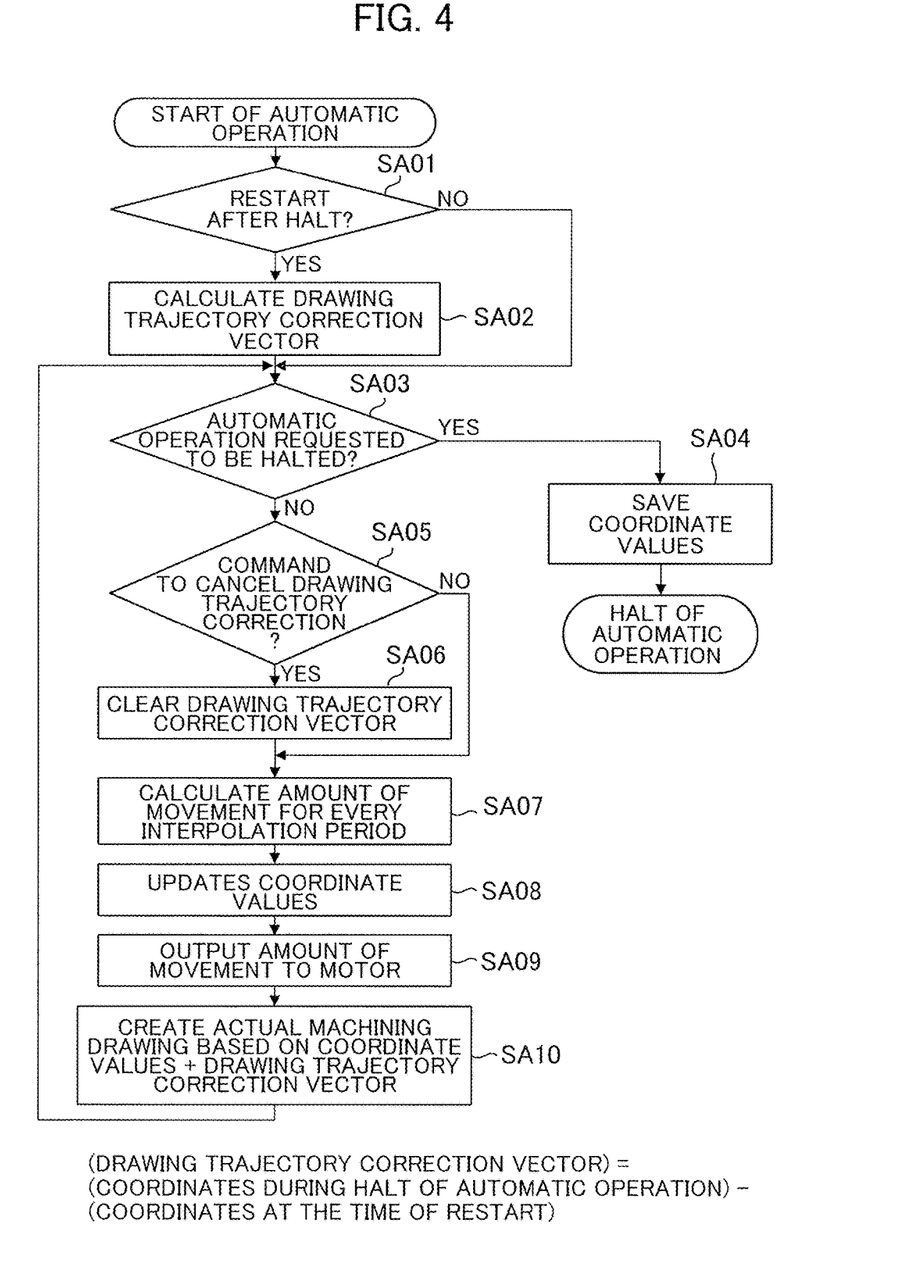
FIG. 4 is a flowchart showing a flow of an automatic operation process performed on the numerical controller of FIG. 2.

FIG. 4 is a flowchart showing a flow of an automatic operation process performed on the numerical controller 1 equipped with the first form of the drawing path correction function described above.

[Step SA01] It is determined whether or not a restart after a halt has been commanded by an operator. If a restart after a halt has been commanded, the process proceeds to step SA02. If a restart after a halt has not been commanded, the process proceeds to step SA03.

[Step SA02] Based on the axial position moved by manual operation and stored, the trajectory correction vector calculation means 150 calculates the drawing trajectory correction vector.

[Step SA03] It is determined whether or not there is a request to halt automatic operation. If there is a request to halt automatic operation, the process proceeds to step SA04. If there is no request to halt automatic operation, the process proceeds to step SA05.

[Step SA04] The trajectory correction vector calculation means 150 saves the current axial position and halts the automatic operation.

[Step SA05] It is determined whether or not the program command read from the machining program is a command to cancel drawing trajectory correction. If the program command is a command to cancel drawing trajectory correction, the process proceeds to step SA06. If the program command is not a command to cancel drawing trajectory correction, the process proceeds to step SA07.

[Step SA06] The drawing trajectory correction vector is cleared.

[Step SA07] An interpolation process is performed to calculate the amount of movement for every interpolation period.

[Step SA08] The coordinate update means 120 updates coordinate values based on data on interpolation process result calculated in the process of step SA07.

[Step SA09] Based on data on the interpolation process result calculated in the process of step SA07, the axis control circuit 14 outputs the amount of movement to a servomotor via the servo amplifier 17.

[Step SA10] The drawing trajectory creating means 130 creates data on the drawing trajectory (machining trajectory) based on the inputted axial coordinate values (output coordinate values plus drawing trajectory correction vector), and outputs the created data to the graphics control circuit 23, thereby drawing the machining trajectory. Then, the process returns to step SA03.

Figure 5:
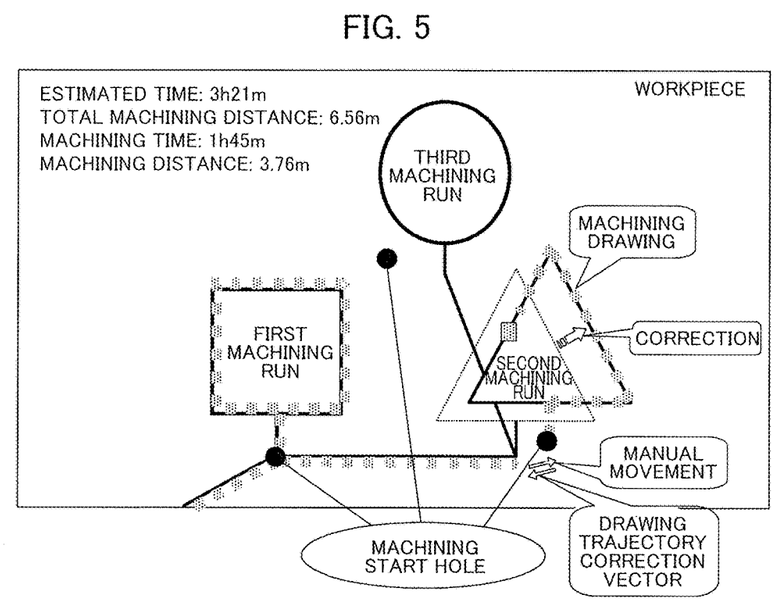
FIG. 5 is a diagram showing another display example of an unmachined path and machining trajectory displayed on the display apparatus of the numerical controller shown in FIG. 2.

Note that although an example of drawing of a trajectory of machining drawing by correcting the trajectory based on a drawing trajectory correction vector has been described above, the present invention may be configured to correct display position of the second path of check drawing. In that case, as shown in FIG. 5, an unmachined path obtained by analyzing the machining program executed after a restart of automatic operation is corrected (in a direction opposite the correction to the machining trajectory) based on the drawing trajectory correction vector in order to redraw the second path.

Although, in the drawing path correction function of this form, the drawing trajectory is corrected according to the deviation of the start hole at the start of each machining run, the present invention is not limited to this, and the drawing trajectory may be corrected by detecting deviations caused by every manual intervention during automatic operation (movement of axial position before and after manual intervention).

As described above, in the drawing path correction function of this form, the check drawing path and machining trajectory match each other exactly, as a result, the progress of machining can be judged accurately.

Next, a second form of the drawing path correction function implemented on the numerical controller 1 shown in FIG. 1 will be described with reference to FIGS. 6 to 8.

In the first form of the drawing path correction function described above, the drawing trajectory correction vector is calculated according to the movement of axial position caused by manual operation of the operator. In the second form of the drawing path correction function, a start hole is searched for automatically when connection of a wire fails upon issuance of a wire connection command.

Figure 6:
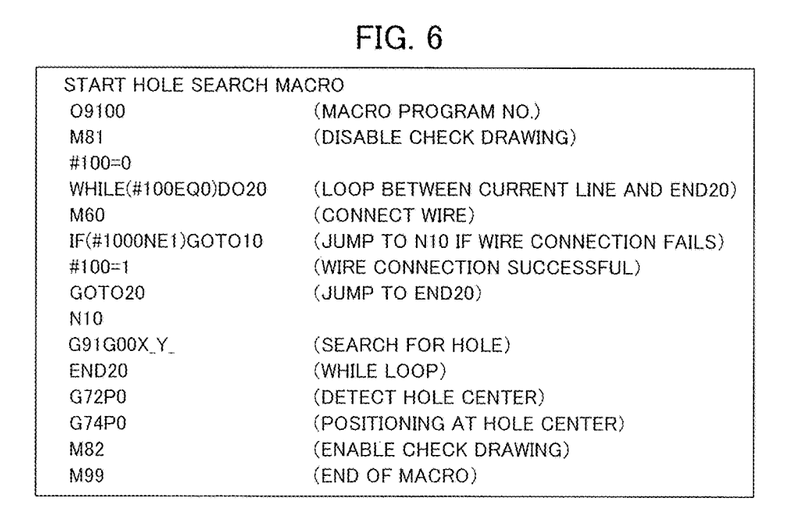
FIG. 6 is an example of macro commands used on the numerical controller of FIG. 7.

FIG. 6 is an example of macro commands used to automatically search for a start hole, connect a wire, and then position the wire at the center position of the start hole when connection of the wire fails upon issuance of a wire connection command.

Since an end position at the end of the macro is indefinite, the move command in the macro is enclosed by a disable check drawing command (M81) and enable check drawing command (M82) such that the move command will not be reflected in the check drawing. The second form of the drawing path correction function determines, during machining, the drawing trajectory correction vector from the coordinates of the axial position at which check drawing is disabled and the coordinates of the axial position at which check drawing is enabled, and corrects the trajectory of machining drawing.

Figure 7:
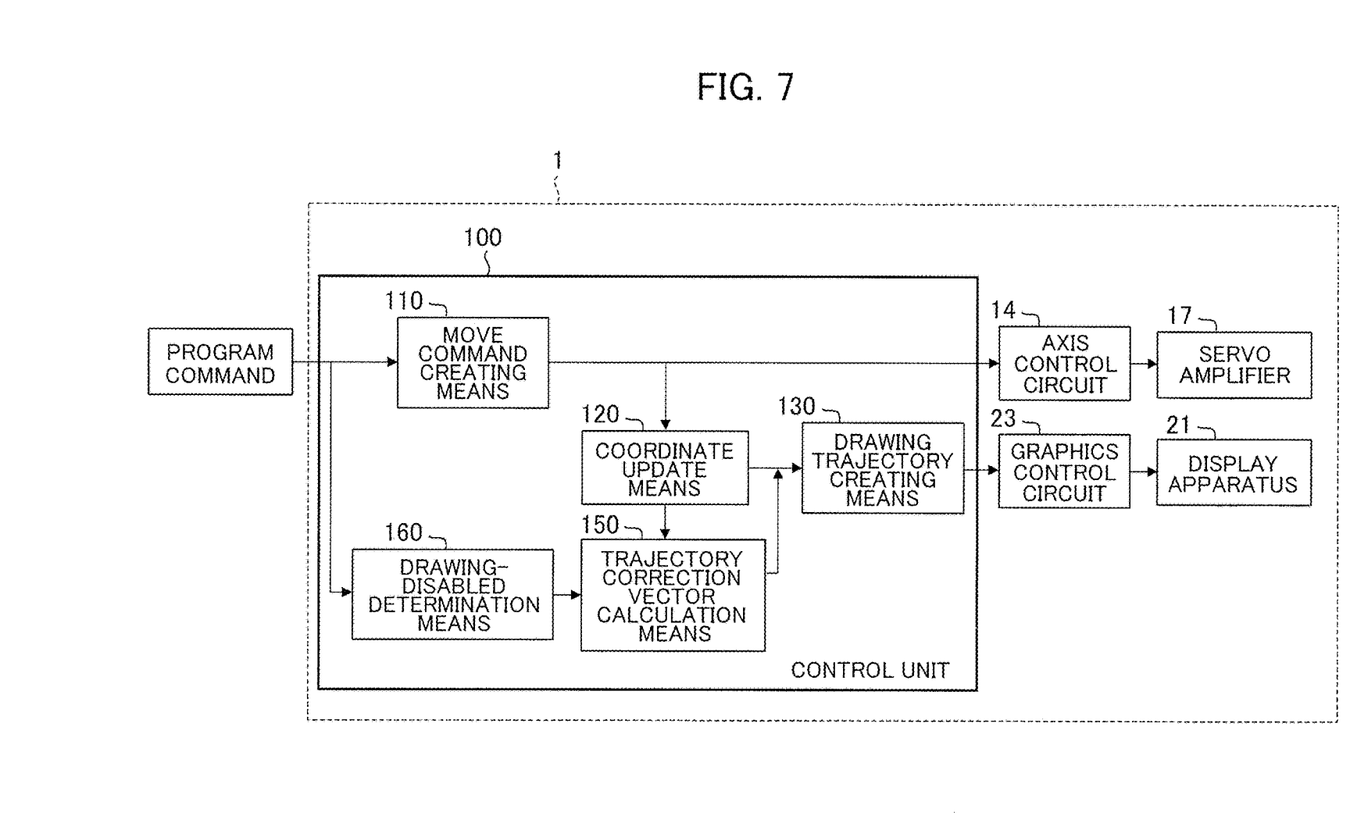
FIG. 7 is a functional block diagram of the numerical controller of FIG. 1 equipped with a second form of the drawing path correction function.

FIG. 7 is a functional block diagram of the numerical controller of FIG. 1 equipped with the second form of the drawing path correction function. The numerical controller 1 shown in FIG. 7 differs from the first form of the drawing path correction function described above in that it is equipped with drawing-disabled determination means 160 instead of the manual-intervention-amount creating means 140.

The drawing-disabled determination means 160 determines whether or not the program command read from the machining program is a disable check drawing command, and commands, if it is determined that the program command is a disable check drawing command, the trajectory correction vector calculation means 150 to store the axial position. The drawing-disabled determination means 160 also determines whether or not the program command read from the machining program is an enable check drawing command, and commands, if it is determined that the program command is an enable check drawing command, the trajectory correction vector calculation means 150 to store the axial position and calculate the drawing trajectory correction vector.

Upon receiving a command from the drawing-disabled determination means 160, the trajectory correction vector calculation means 150 stores the axial position at the start of disenabling of check drawing and the axial position at the release of the disenabling of check drawing, calculates the drawing trajectory correction vector based on the axial position at the start of disenabling of check drawing and the axial position at the release of the disenabling of check drawing with the axis moved to near the center of the start hole in response to a hole search command, and performs corrections to the axial coordinate values to be outputted from the coordinate update means 120 to the drawing trajectory creating means 130 based on the calculated drawing trajectory correction vector. The rest of the configuration is similar to that of the first form of the drawing path correction function described above.

Figure 8:
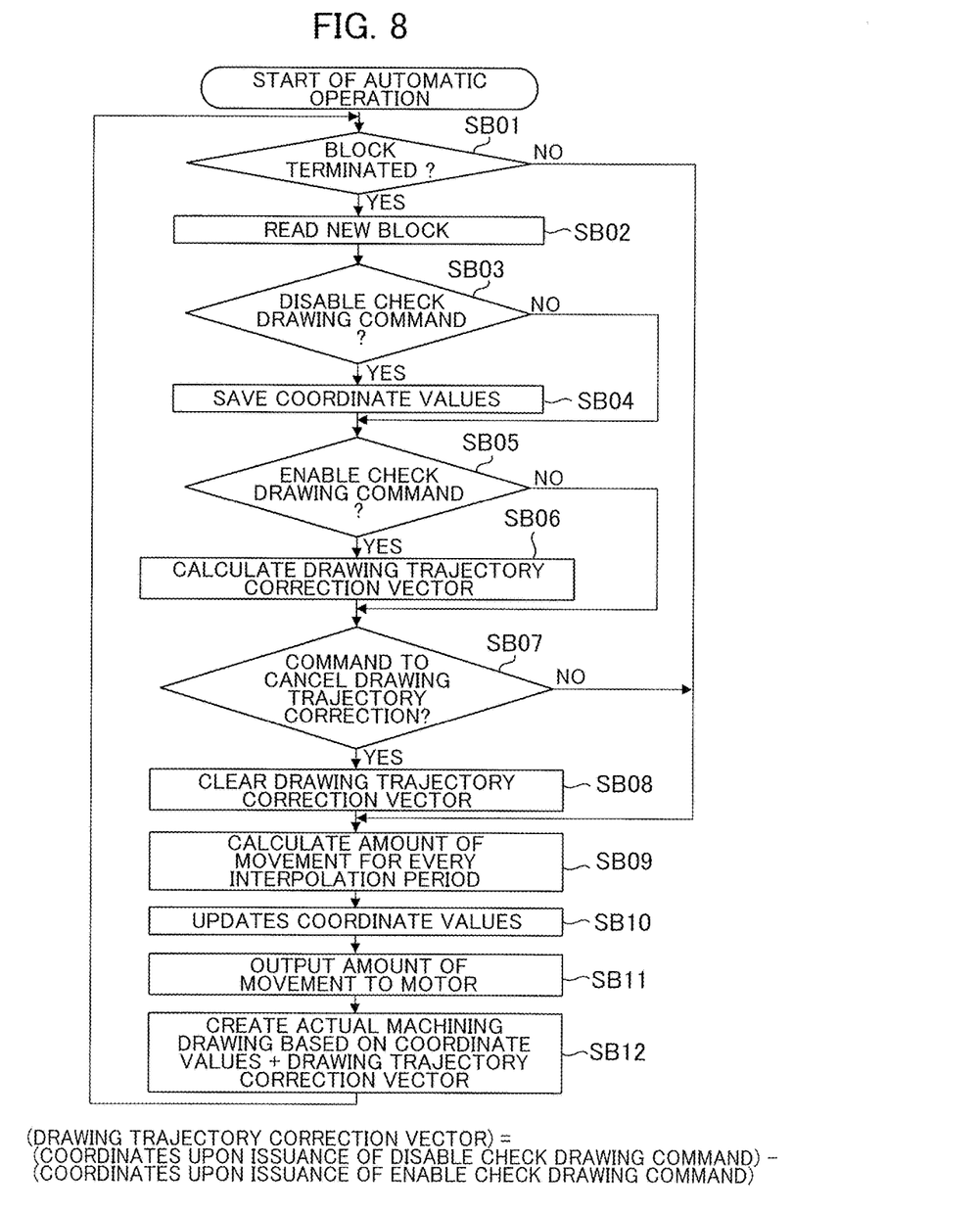
FIG. 8 is a flowchart showing a flow of an automatic operation process performed on the numerical controller of FIG. 7.

FIG. 8 is a flowchart showing a flow of an automatic operation process performed on the numerical controller 1 equipped with the second form of the drawing path correction function described above.

[Step SB01] It is determined whether or not the process of the machining program block read out the previous time has terminated. If the process of the machining program block read out the previous time has terminated, the process proceeds to step SB02. If the process of the machining program block read out the previous time has not terminated, the process proceeds to step SB09.

[Step SB02] A new block is read from the machining program.

[Step SB03] It is determined whether or not the program command of the block read from the machining program is a disable check drawing command. If it is determined that the program command is a disable check drawing command, the process proceeds to step SB04. If it is determined that the program command is not a disable check drawing command, the process proceeds to step SB05.

[Step SB04] The trajectory correction vector calculation means 150 saves the current axial position.

[Step SB05] It is determined whether or not the program command of the block read from the machining program is an enable check drawing command. If it is determined that the program command is an enable check drawing command, the process proceeds to step SB06. If it is determined that the program command is not an enable check drawing command, the process proceeds to step SB07.

[Step SB06] The trajectory correction vector calculation means 150 calculates the drawing trajectory correction vector based on the stored axial position at the start of disablement of drawing and the current axial position.

[Step SB07] It is determined whether or not the program command read from the machining program is a command to cancel drawing trajectory correction. If it is determined that the program command is intended to cancel drawing trajectory correction, the process proceeds to step SB08. If it is determined that the program command is not intended to cancel drawing trajectory correction, the process proceeds to step SB09.

[Step SB08] The drawing trajectory correction vector is cleared.

[Step SB09] An interpolation process is performed to calculate the amount of movement for every interpolation period.

[Step SB10] The coordinate update means 120 updates coordinate values based on interpolation process result data calculated in the process of step SB09.

[Step SB11] Based on the interpolation process result data calculated in the process of step SB09, the axis control circuit 14 outputs the amount of movement to a servomotor via the servo amplifier 17.

[Step SB12] The drawing trajectory creating means 130 creates data on the drawing trajectory (machining trajectory) based on the inputted axial coordinate values (output coordinate values plus drawing trajectory correction vector), and outputs the created data to the graphics control circuit 23, thereby drawing the machining trajectory. Then, the process returns to step SB01.

Note that although an example of drawing a trajectory of machining drawing by correcting the trajectory based on a drawing trajectory correction vector has been described above, the present invention may be configured to correct display position of the second path of check drawing.

The invention claimed is:

1. A numerical controller which controls operation of a machine tool based on a machining program, the numerical controller equipped with a check drawing function for drawing an unmachined path based on the machining program and a machining drawing function for drawing a machining trajectory during operation of the machine tool based on the machining program, the numerical controller including a processor configured to:
   control the machine tool to perform machining of a workpiece;
   calculate a drawing trajectory correction vector which represents an amount of shift in an axial position of the machine tool at which the machining is actually performed from an axial position of the machine tool commanded by the machining program;
   create a corrected machining trajectory by correcting a drawing position of the machining trajectory drawn by the machining drawing function, based on the drawing trajectory correction vector; and
   display the corrected machining trajectory and the unmachined path on a same display screen, the corrected machining trajectory and the unmachined path substantially coinciding on the display screen.

2. The numerical controller according to claim 1, wherein the processor is configured to:
   command an axis of the machine tool to be moved based on a manual operation by an operator of the machine tool, wherein
   the drawing trajectory correction vector is calculated based on axial positions of the machine tool before and after the axis is moved.

3. The numerical controller according to claim 1, wherein the processor is configured to:
   determine whether the check drawing function is enabled or disabled, based on a macro command contained in the machining program; and
   switch the check drawing function between an enabled state and a disabled state, wherein
   the drawing trajectory correction vector is calculated based on axial positions of the machine tool before and after a period when the check drawing function is determined to be disabled.

4. A numerical controller which controls operation of a machine tool based on a machining program, the numerical controller equipped with a check drawing function for drawing an unmachined path based on the machining program and a machining drawing function for drawing a machining trajectory during operation of the machine tool based on the machining program, the numerical controller including a processor configured to:
   control the machine tool to perform machining of a workpiece;
   calculate a drawing trajectory correction vector which represents an amount of shift in an axial position of the machine tool at which the machining is actually performed from an axial position of the machine tool commanded by the machining program;
   create a corrected unmachined path by correcting a drawing position of the unmachined path drawn by the check drawing function, based on the drawing trajectory correction vector; and
   display the corrected unmachined path and the machining trajectory on a same display screen, the corrected unmachined path and the machining trajectory substantially coinciding on the display screen.

5. The numerical controller according to claim 4, wherein the processor is configured to:
   command an axis of the machine tool to be moved based on a manual operation by an operator of the machine tool, wherein
   the drawing trajectory correction vector is calculated based on axial positions of the machine tool before and after the axis is moved.

6. The numerical controller according to claim 4, wherein the processor is configured to:
   determine whether the check drawing function is enabled or disabled, based on a macro command contained in the machining program; and
   switch the check drawing function between an enabled state and a disabled state, wherein
   the drawing trajectory correction vector is calculated based on axial positions of the machine tool before and after a period when the check drawing function is determined to be disabled.

* * * * *